United States Patent
Furukawa

(10) Patent No.: US 10,268,937 B2
(45) Date of Patent: Apr. 23, 2019

(54) IMAGE FORMING APPARATUS, IMAGE FORMING METHOD, AND IMAGE FORMING MANAGEMENT APPARATUS

(71) Applicant: Konica Minolta, Inc., Tokyo (JP)

(72) Inventor: Hiroshi Furukawa, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/439,374

(22) Filed: Feb. 22, 2017

(65) Prior Publication Data

US 2017/0255850 A1  Sep. 7, 2017

(30) Foreign Application Priority Data

Mar. 1, 2016  (JP) ................. 2016-039413

(51) Int. Cl.
*G06K 15/00* (2006.01)
*G03G 15/00* (2006.01)
(Continued)

(52) U.S. Cl.
CPC ..... *G06K 15/4085* (2013.01); *G03G 15/5012* (2013.01); *G06F 3/1234* (2013.01);
(Continued)

(58) Field of Classification Search
CPC .. G03G 15/70; G03G 15/5012; G03G 15/234; G03G 15/205; G03G 2221/1675;
(Continued)

(56) References Cited

U.S. PATENT DOCUMENTS 5,258,818 A   11/1993 Sundquist et al.
5,528,818 A    6/1996 Warneke
(Continued)

FOREIGN PATENT DOCUMENTS

EP   2109011 A1   10/2009
JP   2008252647 A  10/2008
JP   2012108828 A   6/2012

OTHER PUBLICATIONS

Extended European Search Report dated Jul. 27, 2017 from corresponding European Application No. 17153685.7.
(Continued)

*Primary Examiner* — Chad Dickerson
(74) *Attorney, Agent, or Firm* — Lucas & Mercanti, LLP

(57) ABSTRACT

An image forming apparatus includes an image forming unit that forms an image on a transfer medium on the basis of image data, a feeder that feeds the transfer medium, and a control unit that manages image data and controls the image forming unit and the feeder. In a case where a base image and an overprint image are printed by the same image forming apparatus, the control unit can manage first image data of the base image and second image data of the overprint image by associating the data with each other, and when a jam of the transfer medium is detected during output of an overprint image, the control unit causes a transfer medium to which the base image is output by the image forming apparatus to be replenished for print instead of a jammed transfer medium removed by jam processing.

12 Claims, 9 Drawing Sheets

(51) Int. Cl.
  *G06F 3/12* (2006.01)
  *H04N 1/00* (2006.01)
  *G06K 15/16* (2006.01)
  *G06K 15/02* (2006.01)

(52) U.S. Cl.
  CPC ......... *G06K 15/16* (2013.01); *G06K 15/1867* (2013.01); *G06K 15/404* (2013.01); *H04N 1/00084* (2013.01); *G03G 15/70* (2013.01); *G03G 2221/1675* (2013.01); *G06K 2215/0065* (2013.01); *G06K 2215/0085* (2013.01)

(58) Field of Classification Search
  CPC ........... H04N 1/00477; H04N 1/32609; H04N 1/32635; H04N 1/32667; H04N 1/00482; H04N 1/00084; H04N 1/00917; H04N 1/00928; B41J 13/009; B41J 13/60; G06F 3/121; G06F 3/1234; G06F 3/1243; G06F 3/1261; G06F 3/1262; G06K 15/4085; G06K 15/16; G06K 15/1867; G06K 15/404; G06K 15/5012; G06K 2215/0065; G06K 2215/0085
  USPC ................ 358/1.11–1.18; 399/8–21
  See application file for complete search history.

(56) References Cited

U.S. PATENT DOCUMENTS

| | | | | |
|---|---|---|---|---|
| 5,745,661 A | * | 4/1998 | Koh | G03G 15/70 358/1.14 |
| 2004/0114945 A1 | * | 6/2004 | Takagi | B41J 13/009 399/21 |
| 2007/0140710 A1 | * | 6/2007 | Okano | G03G 15/55 399/13 |
| 2007/0188772 A1 | * | 8/2007 | Davis | H04N 1/0035 358/1.1 |
| 2008/0260395 A1 | * | 10/2008 | Honma | G03G 15/5062 399/15 |
| 2011/0109930 A1 | * | 5/2011 | Eom | G06F 3/1206 358/1.13 |
| 2011/0135326 A1 | * | 6/2011 | Anno | G03G 15/6508 399/21 |
| 2011/0262153 A1 | * | 10/2011 | Kurasawa | B41J 11/006 399/21 |
| 2012/0128385 A1 | * | 5/2012 | Song | G03G 15/5004 399/88 |
| 2014/0168708 A1 | * | 6/2014 | Chew | H04N 1/00957 358/1.18 |
| 2015/0049356 A1 | | 2/2015 | Saitsu | |
| 2015/0363138 A1 | * | 12/2015 | Inose | G06F 3/121 358/1.14 |

OTHER PUBLICATIONS

Extended European Search Report dated Jun. 19, 2018 from corresponding European Application No. EP 17153685.7.

Office Action dated Oct. 9, 2018 in the corresponding Chinese Application No. 201710116855.4 and English tranlsation.

* cited by examiner

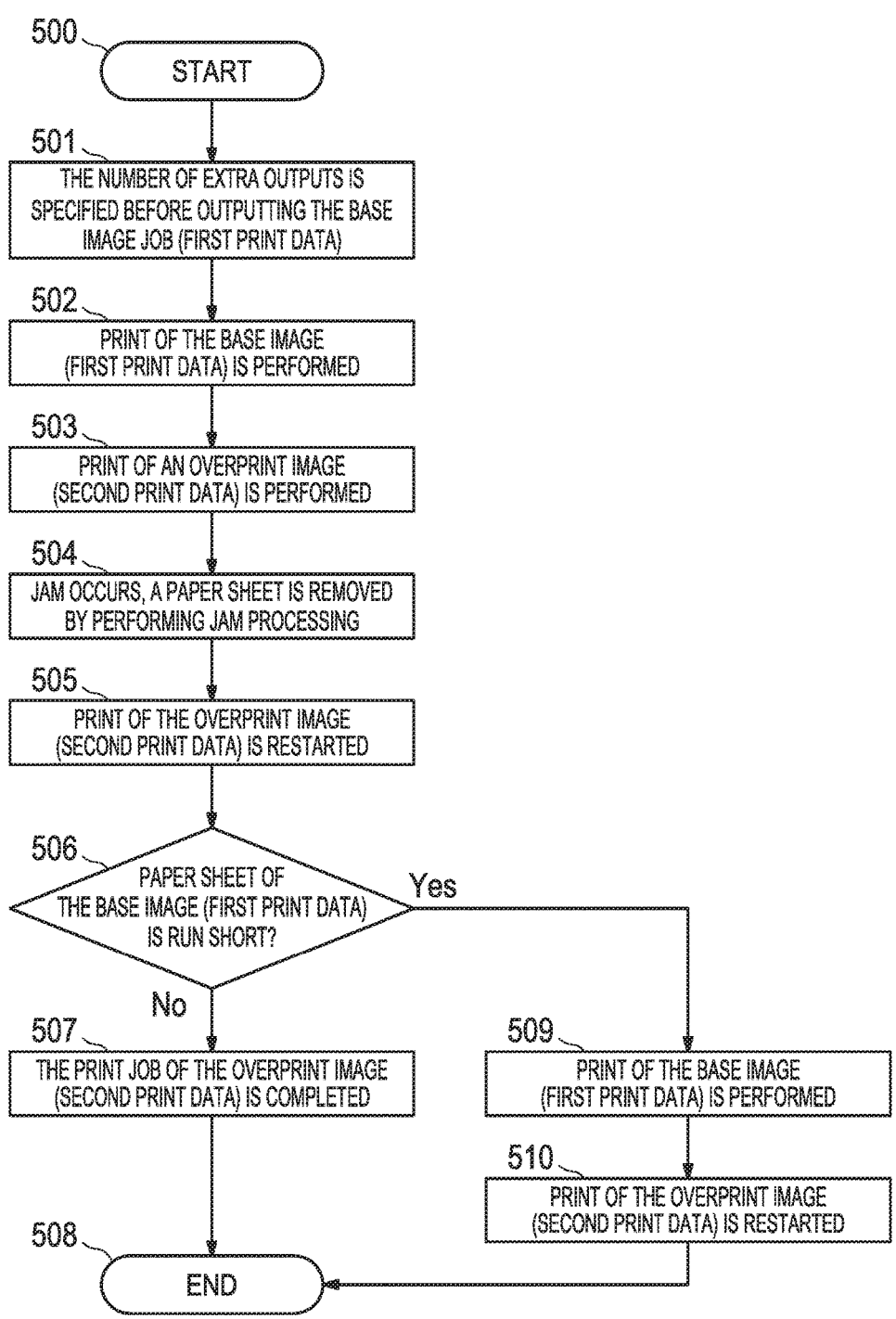

IMAGE FORMING APPARATUS, IMAGE FORMING METHOD, AND IMAGE FORMING MANAGEMENT APPARATUS

The present U.S. patent application claims a priority under the Paris Convention of Japanese patent application No. 2016-039413 filed on Mar. 1, 2016, the entire content of which is hereby incorporated by reference.

BACKGROUND OF THE INVENTION

Field of the Invention

The present invention relates to an image forming apparatus, an image forming method, and an image forming management apparatus, configured to print a base image and an overprint image with the same apparatus.

Description of the Related Art

In an image forming apparatus that forms an image on a transfer medium on the basis of image data, sometimes a base image is first printed on a transfer medium, and then overprinting is applied to the transfer medium.

When overprinting is applied, base image output and overprint image output are conventionally performed by different image forming apparatuses in many cases. For example, base image output is performed by a color enabled image forming apparatus, and overprint image output is performed by a monochrome enabled image forming apparatus. In such a system, when a jam occurs during overprint image output and a paper sheet on which a base image is printed is removed by jam processing, an image forming apparatus for outputting a base image creates a paper sheet on which the base image is printed to make up for a shortage.

When overprinting is performed, good consistency between a base image and an overprint image is required. Thus, Japanese Patent Laid-Open No. 2012-108828 (Patent Literature 1) proposes an image forming apparatus including a reading unit that reads out an image on a paper sheet housed in a paper sheet housing unit; and a comparison unit that compares reading image data acquired by reading of the reading unit with image data on an image data for an overprint paper sheet. In Patent Literature 1, a print error occurring in overprinting is prevented to enable a correct image to be formed on an overprint paper sheet.

In addition, Japanese Patent Laid-Open No. 2008-252647 (Patent Literature 2) proposes an apparatus capable of detecting a misprint in an image forming unit by comparing an image acquired by superimposing image data on a first image previously formed on a recording medium and input image data for forming an image on a recording medium, with a second image formed on the recording medium after image forming. This enables a misprint to be accurately detected when overprinting is performed.

In a case where print of a base image and overprinting are performed by the same image forming apparatus, once a jam occurs when an overprint image is printed, a paper sheet on which a base image is printed is to be removed by jam processing.

SUMMARY OF THE INVENTION

If a job continues without change after the jam processing, there is a problem in that a shortage of paper sheets on each of which a base image is printed also causes a shortage of final deliverables.

In the apparatuses proposed in Patent Literatures 1 and 2, while print quality in overprinting is considered, a measure against a jam that occurs in the overprinting is not considered at all, and thus it is difficult to solve the problem.

The present invention is made under the above-mentioned circumstances as a background, and an object thereof is to provide an image forming apparatus, an image forming method, and an image forming management apparatus, capable of acquiring final deliverables without a shortage even if a jam occurs during overprinting.

To achieve at least one of the above-mentioned objects, according to an aspect, an image forming apparatus reflecting one aspect of the present invention including:

an image forming unit that forms an image on a transfer medium on the basis of image data; a feeder that feeds the transfer medium; and a control unit that manages image data and controls the image forming unit and the feeder, wherein, in a case where a base image and an overprint image are printed by the image forming apparatus, when a jam of the transfer medium is detected during output of an overprint image, the control unit causes a transfer medium to which the base image is output by the image forming apparatus to be replenished for print instead of a jammed transfer medium removed by jam processing.

In the above-mentioned image forming apparatus, it is preferred that the control unit manages a job of a base image and a job of an overprint image by associating the jobs with each other when the base image and the overprint image are printed by the image forming apparatus.

In the above-mentioned image forming apparatus, it is preferred that the control unit causes a transfer medium to which a base image is output to be replenished for an insufficient transfer medium due to the jam after print for residual overprint images is continued and completed after the jam processing, and causes an overprint image to be printed on the transfer medium which is replenished.

In the above-mentioned image forming apparatus, it is preferred that when post-processing for the base image is needed, the control unit causes a post-processing device to be started for warm up after the jam is detected, and causes a transfer medium to which a base image is output to be replenished for an insufficient transfer medium due to the jam after jam processing is finished.

In the above-mentioned image forming apparatus, it is preferred that the control unit causes an additional transfer medium to which a base image is output again to be used for the replenishment.

In the above-mentioned image forming apparatus, it is preferred that the control unit causes extra output to be performed when a transfer medium to which a base image is printed is prepared, and causes the transfer medium for a shortage to be output when spare transfer media to which a base image is printed run out.

In the above-mentioned image forming apparatus, it is preferred that the control unit compares the number of outputs of a base image with the number of copies set by output of an overprint image, and starts a procedure of output of the base image in a case where the number of outputs of a base image is insufficient, and does not start the procedure of output of the base image base image in a case where the number of outputs of a base image is sufficient In the above-mentioned image forming apparatus, it is preferred that the image forming apparatus further comprises a post-processing device that applies post-processing to a transfer medium on which an image is formed.

To achieve at least one of the above-mentioned objects, according to an aspect, an image forming method reflecting one aspect of the present invention comprising the steps of:

determining whether a jam of a transfer medium occurs during output of an overprint image in a case where a base image and an overprint image are printed by a same image forming apparatus; and replenishing a transfer medium to which the base image is output by the image forming apparatus for print instead of a jammed transfer medium removed through jam processing when the jam occurs.

To achieve at least one of the above-mentioned objects, according to an aspect, an image management apparatus reflecting one aspect of the present invention comprising:

a management control unit that manages the image forming apparatus, wherein when a jam of the transfer medium is detected during output of an overprint image in a case where a base image and an overprint image are printed by the same image forming apparatus, the management control unit performs control of causing an additional transfer medium to which the base image is output by the image forming apparatus to be replenished for print instead of a jammed transfer medium removed through jam processing.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 9 is a flowchart illustrating a procedure for performing extra output of a base image in anticipation of a jam that occurs during output of an overprint image in yet another embodiment of the present invention.

DETAILED DESCRIPTION OF THE PREFERRED EMBODIMENTS

Hereinafter, an embodiment of the present invention will be described with reference to accompanying drawings. However, the scope of the invention is not limited to the illustrated examples.

Figure 1:
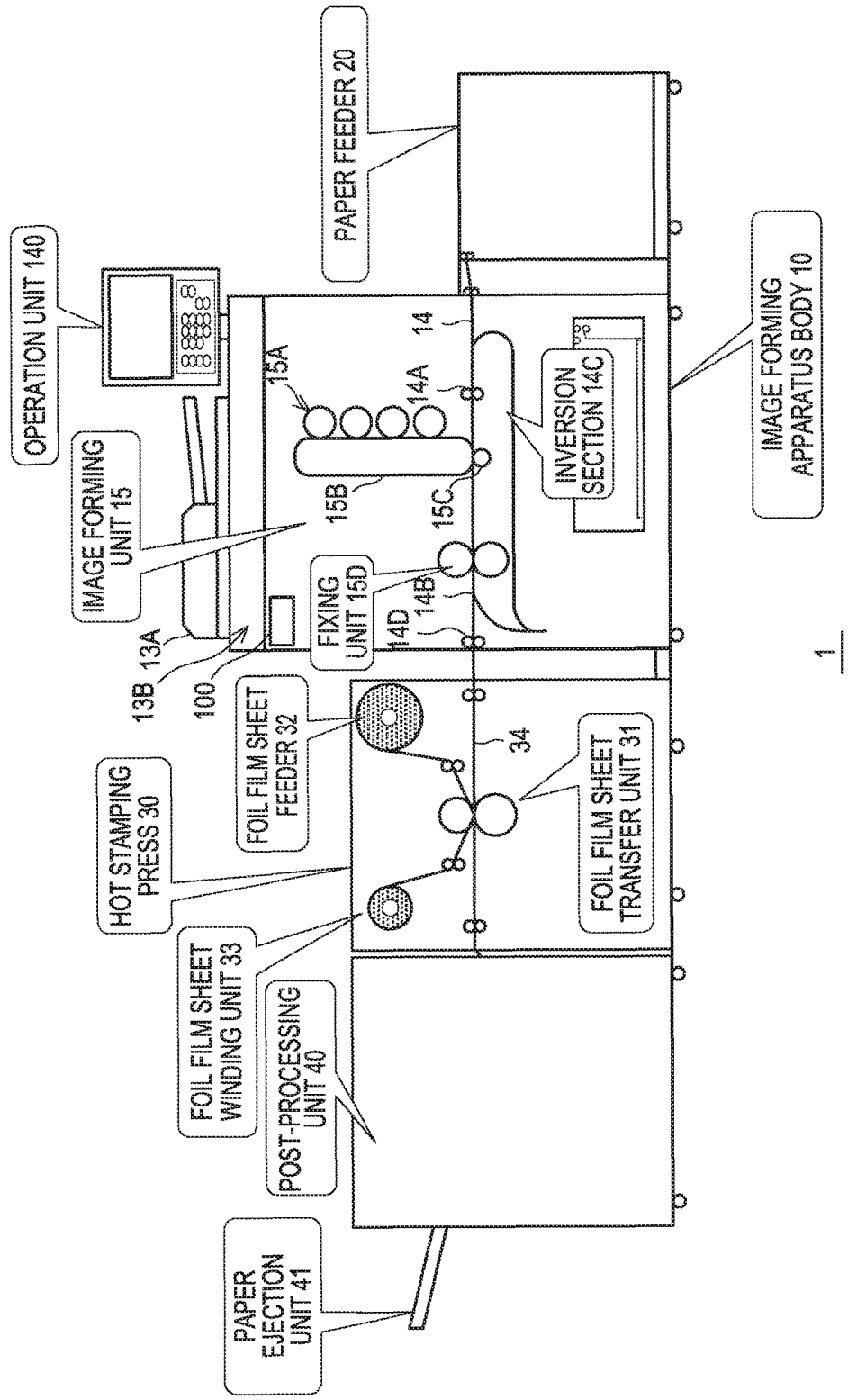
FIG. 1 illustrates an outline of an image forming apparatus and an image forming system of an embodiment of the present invention.

FIG. 1 illustrates a mechanical outline of an image forming system 1 including an image forming apparatus.

The image forming system 1 includes a paper feeder 20, an image forming apparatus body 10, a foil stamping press 30, and a post-processing unit 40. The post-processing unit 40 corresponds to a post-processing device of the present invention. In this embodiment, the image forming apparatus body 10 corresponds to an image forming apparatus. As the present invention, the image forming apparatus body 10 including the paper feeder 20, the foil stamping press 30, and the post-processing unit 40 can be the image forming apparatus, and a configuration of the image forming apparatus is not particularly limited.

The paper feeder 20 has a mechanism for holding transfer paper, and is coupled to an upstream side of the image forming apparatus body 10 in a paper sheet feeding direction, the paper feeder 20 including multiple paper feed trays (not illustrated) for housing a paper sheet. Each of the paper feed trays is a universal tray that is configured so that a paper sheet with a predetermined size can be set. The paper feeder 20 takes a paper sheet one by one from the paper feed tray in which a paper sheet specified by a user is housed, and feeds the paper sheet in series to the image forming apparatus body 10 on a downstream side through a conveyance roller or the like. While an example of using one paper feeder 20 is described in the present embodiment, the invention is not limited to the example, and two or more paper feeders 20 can be coupled to each other. The paper sheet corresponds to a transfer medium in the present invention. The transfer medium is not limited to paper, and can be cloth or plastic. As the present invention, a medium on which an image can be transferred is available, and thus material thereof is not limited.

The image forming apparatus body 10 transfers an image to a paper sheet fed from the paper feeder 20 or a paper feeder in the image forming apparatus body 10 during foil stamping processing, and feeds the paper sheet to the foil stamping press 30 at a subsequent stage.

In addition, the image forming apparatus body 10 includes an operation unit 140 to accept settings of various conditions for overprinting, and the like, set by user operation. The operation unit 140 is attached on a top face of a cabinet of the image forming apparatus body 10, and includes a touch panel formed of a liquid crystal display (LCD) or the like, and a hard key including numeric buttons, a print start button, and the like, provided in a peripheral portion of the touch panel, for example. The operation unit 140 enables settings of selecting processing contents to be performed when a jam occurs during overprinting, such as: a mode in which overprinting is stopped after jam processing and a base image is printed; a mode in which overprinting is continued and print of a base image is restarted when a paper sheet runs out; a mode in which warm up of a post-processing device is started in a job of performing post-processing when a jam occurs; and a mode in which when a base image is printed, extra paper sheets are printed.

The acceptance described above also can be performed by various methods such as a method using a computer or the like (not illustrated) connected to the image forming apparatus body 10 through a network.

The foil stamping press 30 has a mechanism of transferring a foil image on an image transferred by an image forming unit, and coupled to a downstream side of the image forming apparatus body 10 in the paper sheet feeding direction. A foil sheet is pressed on a paper sheet on which a predetermined foil image is transferred, the paper sheet being fed from the image forming apparatus body 10, while being heated to transfers the predetermined foil image. The paper sheet on which the predetermined foil image is transferred is fed to the post-processing unit 40 at a subsequent stage. If the foil image is not transferred, the paper sheet is directly fed to the post-processing unit 40.

The post-processing unit 40 coupled to a downstream side of the foil stamping press 30 in the paper sheet feeding direction. The post-processing unit 40 applies finisher processing to a paper sheet fed from the foil stamping press 30 after image forming is completed, the finisher processing including staple processing, folding-in-the-middle processing, folding-in-three processing, and saddle stitch staple processing, for example. In addition, the post-processing unit 40 ejects a paper sheet to which foil stamping processing is applied by the foil stamping press 30 into an output tray.

(Configuration Example of Image Forming Apparatus)

Next, a configuration example of the image forming apparatus body 10 will be described with reference to FIG. 1. The image forming apparatus body 10 is an image forming apparatus called a tandem type, and includes a control unit 100, an operation unit 140, an automatic document feeder 13A, an image reading unit 13B, an image forming unit 15, a fixing unit 15D, a paper feeder 20, and the like.

Figure 2:
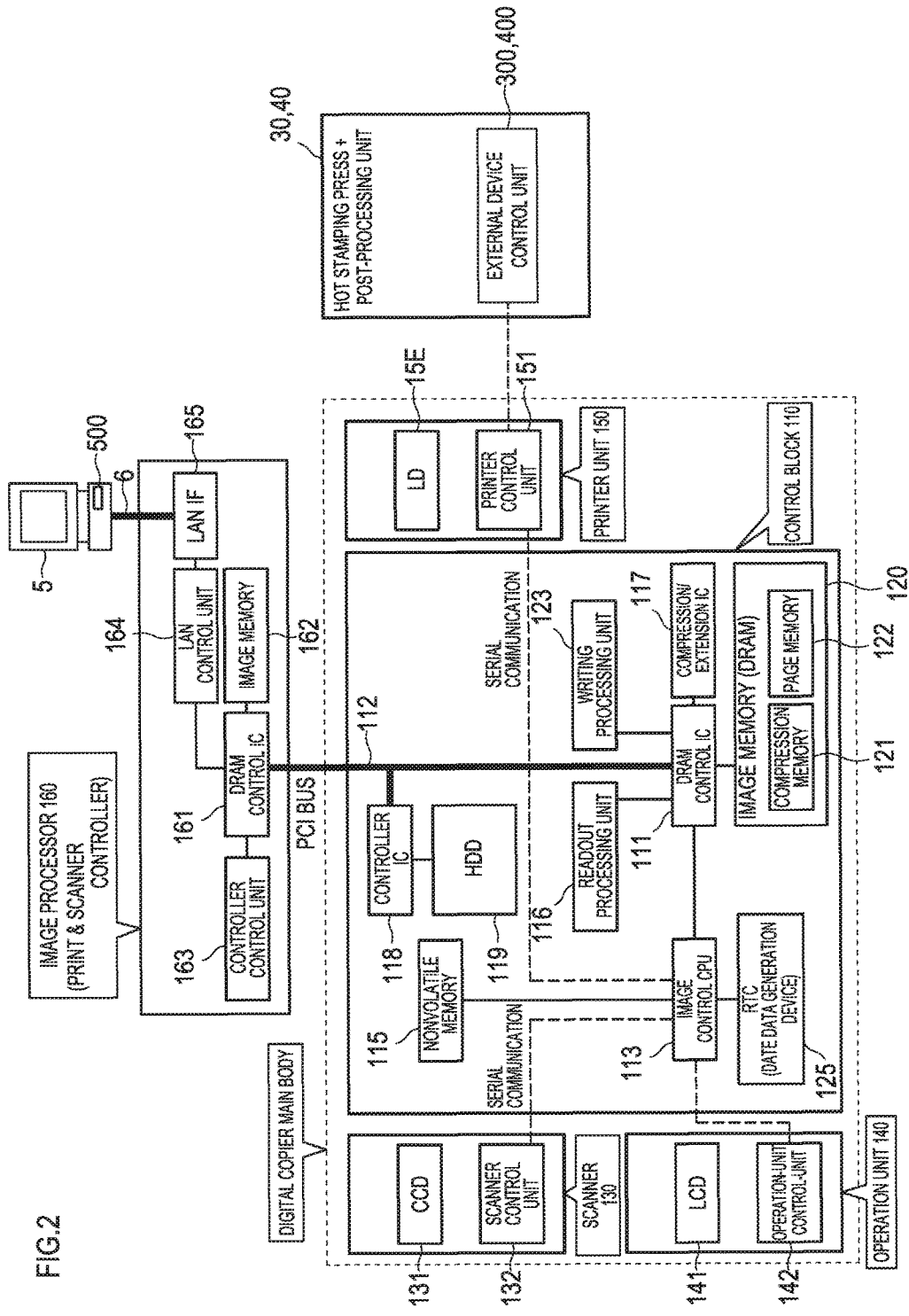
FIG. 2 is a control block diagram of the embodiment.

The image reading unit 13B irradiates a document or the like fed one by one from the automatic document feeder 13A with light from a light source, and acquires image data on the document by receiving a reflected light from the document using a charge coupled device (CCD) 131 (illustrated in FIG. 2). The image data acquired by the image reading unit 13B is processed by analog processing, analog/digital (hereinafter referred to as A/D) conversion processing, image compression processing, and the like, applied by a readout processing unit 116 (illustrated in FIG. 2).

The operation unit 140 accepts settings including a setting whether a paper sheet needs foil image print, set by a user, while displaying a selection screen for settings such as: a setting of kind of a paper sheet used as a transfer medium; a setting of selection of a foil processing region to which a foil is to be transferred, from all image data; a setting of a contour region in which each image in a predetermined toner image is thickened and enlarged to perform foil processing; or the like. The operation unit 140 can be provided in the foil stamping press 30. A method of setting a foil processing region from all image data is performed by: a setting by selecting an attribute such as a character, a line drawing, and a graphic; or a setting by selecting a foil processing region by inputting coordinates, for example.

The image forming unit 15 forms an image by using an electrophotographic method, and forms an image with colors of yellow (Y), magenta (M), and cyan (C), and an image with a color of black (K). The image forming unit 15 includes an intermediate transfer belt 15B for holding an image formed and developed by photoreceptors 15A for the respective colors, and a secondary transfer roller 15C for transferring the image on the intermediate transfer belt 15B to a paper sheet.

The image forming unit 15 includes the photoreceptors 15A for the respective colors around which an electrification section, an exposure section, a developing section, and a cleaning section, are disposed. In FIG. 1, the electrification section, the exposure section, the developing section, and the cleaning section are not illustrated. There is a description for each color below.

The electrification section almost uniformly charges a front face of the photoreceptor 15A of each color. The exposure section is composed of an LED print head (LPH) having an LED array and an imaging lens, or a polygon mirror type laser exposure optical scanner, for example, and scans the photoreceptor 15A with a laser beam on the basis of image data to form an electrostatic latent image. The developing section develops an electrostatic latent image formed on the photoreceptor 15A with a toner. Accordingly, a toner image being a visible image is formed on the photoreceptor 15A. The intermediate transfer belt 15B is stretched by a plurality of rollers while being supported to be able to run. The intermediate transfer belt 15B runs, and a toner image formed on each photoreceptor 15A is first transferred at an image transfer position on the intermediate transfer belt 15B. The image transferred on the intermediate transfer belt 15B is transferred on a paper sheet by the secondary transfer roller 15C. The image transferred on the paper sheet is fixed by the fixing unit 15D. A transparent color can be used as the colors. While a color enabled image forming apparatus is described in the embodiment above, an image forming apparatus for a monochrome is also available.

In the present embodiment, when a predetermined foil processing region to be printed where a foil image is to be transferred is selected by using the operation unit 140 or a computer or the like (not illustrated), for example, image data on the foil processing region to be printed is formed in the photoreceptor 15A. A toner image of the image data can be formed by using any one of a yellow color, a magenta color, a cyan color, and a black color, or by using colors composed of at least two or more colors of the colors.

The paper feeder 20 and a paper feeder in the image forming apparatus body 10 each have a plurality of paper feed trays (not illustrated) for housing the corresponding paper sheets with sizes of A3, A4, and the like. A taken paper sheet is fed on a feeding path 14 through a conveyance roller and a resist roller 14A.

The paper sheet fed to the resist roller 14A is corrected by resist correction for correcting an oblique motion of a paper sheet by using the resist roller 14A. When the resist correction is finished, the paper sheet is fed to the secondary transfer roller 15C at a predetermined timing. In the secondary transfer roller 15C, a toner image transferred at the image forming position on the intermediate transfer belt 15B is secondarily and integrally transferred on a front face of a paper sheet fed from the paper feeder 20. The secondarily transferred paper sheet is fed to the fixing unit 15D.

The fixing unit 15D is provided downstream of the secondary transfer roller 15C in the paper sheet feeding direction, and includes a pressing roller, a heating roller, and the like. The fixing unit 15D applies pressing and heating processing to a paper sheet on which an image is transferred in the secondary transfer roller 15C to fix a toner image on a front face of the paper sheet to the paper sheet.

A switching section 14B is provided downstream of the fixing unit 15D in a feeding direction to switch a feeding path of a paper sheet between a paper ejection path and an inversion path. The switching section 14B controls switching of a feeding path on the basis of a selected print mode (single-sided print mode or both sides print mode). A paper sheet in which print on a single side is finished by the single-sided print mode, or a paper sheet in which print on both sides is finished by the both sides print mode, is fed to the foil stamping press 30 by a paper ejection roller 14D after fixing processing is applied to the paper sheet by the fixing unit 15D.

Meanwhile, when a paper sheet is inverted upside down in the both sides print mode, a paper sheet with a front face on which an image is formed or a paper sheet with a front face on which no image is formed, is fed to an inversion section 14C through the switching section 14B. The inversion section 14C has a mechanism for inverting a paper sheet so that a back face thereof is printed. A paper sheet fed to the inversion section 14C is fed while a trailing end of the paper sheet is switched back to a head thereof by inverse rotation control, and then is fed to the image forming unit 15 again while the paper sheet is inversed upside down. The secondary transfer roller 15C transfers a predetermined toner image on a back face of the paper sheet fed to the image forming unit 15 again, as with the image forming processing on a front face of a paper sheet. In the present embodiment, when a predetermined toner image is transferred to each of faces of a paper sheet, the paper sheet is inverted upside down to allow the predetermined toner image to be transferred also to a back face. The paper sheet with a back face on which a toner image is transferred by the image forming unit 15 is fed to the foil stamping press 30 through the paper ejection roller 14D and the like after fixing processing is applied to the paper sheet by the fixing unit 15D.

The control unit 100 controls the entire image forming apparatus body 10 as well as the image forming system 1. The control unit 100 is composed of a CPU and a storage unit storing a program of operating the CPU, an operation parameter, and the like. In the image forming system 1, a paper sheet detector (not illustrated) is provided in a path through which a paper sheet is to be fed, and a detection result of the paper sheet detector is fed to an image control CPU 113. The image control CPU 113 can detect occurrence of a jam on the basis of a detection result from the paper sheet detector when feeding is controlled.

(Configuration Example of Foil Transfer Device)

Subsequently, the foil stamping press 30 will be described. As shown in FIG. 1, the foil stamping press 30 includes feeding path 34 so as to be connected to a feeding path 14 of the image forming apparatus body 10, and is connected to the post-processing unit 40a on a downstream side in the feeding direction. In the foil stamping press 30, a foil film sheet feeder 32 is provided on an upstream side, and a foil film sheet is provided in a roll state to enable one end thereof to be fed out. In addition, in the foil stamping press 30, a foil film sheet winding unit 33 is provided on a downstream side foil to wind a foil film sheet fed out from the film sheet feeder 32 and used for transfer.

In the middle of the feeding path 34, a foil film sheet transfer unit 31 is provided, and a foil film sheet is stretched between the foil film sheet feeder 32 and the foil film sheet winding unit 33 through the foil film sheet transfer unit 31 in a movable manner.

In the foil film sheet transfer unit 31, a foil film sheet is positioned on an upper surface side, and a paper sheet fed through the feeding path 34 is moved below the foil film sheet.

In transfer of a foil film, feeding of a paper sheet and movement of a foil film sheet are performed so that feeding speed of the paper sheet and movement speed of the foil film sheet between the foil film sheet feeder 32 and the foil film sheet winding unit 33 are controlled to be the same speed. In the foil film sheet transfer unit 31, a foil film sheet is fed from the foil film sheet feeder 32, and a developer of the paper sheet on which an image is formed and the foil film sheet are stacked with each other and heated in the foil film sheet transfer unit 31, and then the foil sheet is fixed with the melted developer. Upper and lower rollers of the foil film sheet transfer unit 31 are pressed to each other only when a foil image is transferred copying, and are not pressed to each other when a normal image is fed. The foil film sheet on which transfer is applied is recovered by the foil film sheet winding unit 33.

In the post-processing unit 40, appropriate processing, such as stapling, punching, folding, and bookbinding, is performed as needed, and a paper sheet is ejected to the paper ejection unit 41. If post-processing is not performed, a paper sheet is directly ejected to the paper ejection unit 41.

Subsequently, a control block in an image forming system will be described with reference to FIG. 2.

The image forming apparatus body 10 mainly includes: a digital copier having a control block 110, a scanner 130, an operation unit 140, and a printer unit 150; and an image processor (print and scanner controller) 160 that processes image data inputted and output between an external device 5 and the image forming apparatus body 10 through a network 6.

The control block 110 includes a PCI bus 112, and the PCI bus 112 is connected to a DRAM control IC 111 in the control block 110. In addition, a HDD 119 is connected to the PCI bus 112 through a controller IC 118. The HDD 119 can perform storage of image data, and the like.

In addition, the control block 110 includes an image control CPU 113, and the DRAM control IC 111 is connected to the image control CPU 113. Further, a nonvolatile memory 115 is connected to the image control CPU 113. The nonvolatile memory 115 stores a program to be executed in the image control CPU 113 described above, setting data of the image forming apparatus body 10, a process control parameter, and the like.

The image control CPU 113 controls the entire image forming apparatus by executing a program, and grasps a state of the entire image forming apparatus, and also performs control of paper sheet feeding, control of image forming, and the like. That is, the image control CPU 113, the program operating in the image control CPU 113, the nonvolatile memory 115, and the like, constitute the control unit 100 of the present invention. The image control CPU 113 has a function of detecting occurrence of a jam in an apparatus in the image forming system 1.

An RTC (date data generation device) 125 is connected to the image control CPU 113, and can transmit date data to the image control CPU 113.

The scanner 130 includes a CCD 131 that performs optical readout, and a scanner control unit 132 that controls the entire scanner 130. The scanner control unit 132 is connected to the image control CPU 113 to enable serial communication, and undergoes control by the image control CPU 113. The scanner control unit 132 can be composed of a CPU, a program configured to operate the CPU, and the like. The readout processing unit 116 applies data processing to image data read out by the CCD 131. The readout processing unit 116 is connected to the DRAM control IC 111.

The operation unit 140 includes a touch panel type LCD 141, and an operation-unit-control-unit 142. The LCD 141 is connected to the operation-unit-control-unit 142, and the operation-unit-control-unit 142 and the image control CPU 113 are connected to enable serial communication. The configuration above allows the image control CPU 113 to control the operation unit 140. The operation-unit-control-unit 142 can be composed of a CPU, a program configured to operate the CPU, and the like.

In the operation unit 140, various settings for the image forming apparatus body 10, the paper feeder 20, and the post-processing unit 40 are inputted, and image forming, paper sheet feeding, and post-processing are controlled by the image control CPU 113 on the basis of the settings.

The operation unit 140 enables settings in the image forming apparatus and input of operation control conditions such as an operation command, and further enables display and the like of setting contents, states of machines, and information, and is controlled by the image control CPU 113. The operation unit 140 enables predetermined operation and the like to be performed. For example, the operation unit 140 enables setting of modes when a jam occurs during overprinting, the modes including: a mode in which overprinting is stopped after jam processing and a base image is printed; a mode in which overprinting is continued and an insufficient base image is printed after the overprinting is completed; a mode in which warm up of the post-processing unit 40 is started in a job of performing post-processing when a jam occurs; and a mode in which when a base image is printed, extra paper sheets are printed. Any one of these settings can be set in an initial setting, or these settings can be changed in the operation unit 140.

The DRAM control IC 111 is connected to an image memory 120 composed of a compression memory 121 and a page memory 122. The image memory 120 stores image data acquired by the scanner 130 and image data acquired through the network 6. As described above, the image memory 120 is a storage region of image data, and stores image data of a job to be printed. In addition, the DRAM control IC 111 described above enables image data related to a plurality of jobs to be stored in the image memory 120. That is, the image memory 120 also can store image data of a reserved job. In addition, image data also can be stored in the HDD 119.

The DRAM control IC 111 is connected to a compression/extension IC 117 that compresses image data and extends compressed data. The DRAM control IC 111 is connected to a writing processing unit 123. The writing processing unit 123 is connected to an LD 15E of the printer unit 150, and processes data to be used for operation of the LD 15E. The LD 15E is a generic name for an LD for each color. The printer unit 150 controls feeders including the image forming unit 15 and the feeding path 14.

The printer unit 150 includes a printer control unit 151 that controls the entire printer unit 150. The printer control unit 151 is connected to the image control CPU 113 described above, and undergoes control by the image control CPU 113. That is, print operation is started and stopped in accordance with a parameter given from the image control CPU 113. The printer control unit 151 is connected to an external device control unit 300 for the paper feeder 20 and the foil stamping press 30, and an external device control unit 400 for the post-processing unit 40, in a controllable manner, and thus feeding of a paper sheet from a predetermined paper feed tray and control of post-processing can be performed in response to a command from the image control CPU 113 through the printer control unit 151.

The PCI bus 112 connected to the DRAM control IC 111 is connected to a DRAM control IC 161 of the image processor (print and scanner controller) 160. In the image processor (print and scanner controller) 160, the DRAM control IC 161 is connected to an image memory 162. In addition, in the image processor (print and scanner controller) 160, the DRAM control IC 161 is connected to a controller control unit 163, and the DRAM control IC 161 is also connected to a LAN control unit 164 and a LAN interface 165. The LAN interface 165 is connected to the network 6.

The external device 5 is connected to the network 6 to enable transmission and reception of image data to be performed between the external device 5 and the image forming apparatus body 10. In addition, the external device 5 includes an external device control unit 500 to control not only the external device 5 but also communication with the image forming apparatus body 10.

The external device 5 can be configured to manage the image forming apparatus, and can transmit a control command to the image forming apparatus, or can directly control the image forming apparatus. In this case, the external device 5 corresponds to the management apparatus of the present invention, and the external device control unit 500 corresponds to the management control unit of the present invention.

In this case, the external device control unit 500 can manage the image forming apparatus body 10. The external device control unit 500 can be composed of a CPU, a program configured to operate the CPU, a storage unit, and the like. The external device control unit 500 enables the image forming apparatus body 10 to perform image forming, and enables instruction for selection of a single-sided print mode and a both sides print mode and control thereof with respect to the image forming apparatus body 10. The external device 5 can be further connected to the network 6 as a WAN.

Subsequently, basic operation of the image forming apparatus body 10 above will be described.

First, a procedure of accumulating image data in the image forming apparatus body 10 will be described. When the scanner 130 reads out an image of a document to create image data, the scanner 130 optically reads out the image of the document from the document by using the CCD 131. In this case, the scanner control unit 132 instructed by the image control CPU 113 controls operation of the CCD 131. The readout processing unit 116 applies data processing to an image read out by the CCD 131. Image data acquired by the data processing is compressed in the compression/extension IC 117 by a predetermined method, and stored in the compression memory 121 and the HDD 119 through the DRAM control IC 111. The image data stored in the compression memory 121 and the HDD 119 can be managed as a job by the image control CPU 113.

When image data is acquired from the outside, for example, image data transmitted from the external device 5 or the like through the network 6 is stored in the image memory 162 through the LAN interface 165 and the LAN control unit 164 by the DRAM control IC 161 controlled by the controller control unit 163. Data in the image memory 162 is temporarily stored in the page memory 122 through the DRAM control IC 161, the PCI bus 112, and the DRAM control IC 111. The data stored in the page memory 122 is sequentially transmitted to the compression/extension IC 117 through the DRAM control IC 111, and then compression processing is applied to the data. The data is stored in the compression memory 121 or the HDD 119 through the DRAM control IC 111, and is managed by image control CPU 113 as described above.

When the image forming apparatus body 10 outputs an image, or is used as a copier or a printer, image data stored in the compression memory 121 or the HDD 119 is transmitted to the compression/extension IC 117 through the DRAM control IC 111, and then the image data is extracted. The extracted image data is repeatedly expanded to the LD 15E by the writing processing unit 123 to enable the image data to be printed on a paper sheet.

When the image forming apparatus body 10 is used as a copier, information such as print conditions (print modes) set in the operation unit 140 is notified, and the image control CPU 113 creates setting information. The created setting information can be stored in a RAM in the image control CPU 113. The image control CPU 113 also designates normal print.

When the image forming apparatus body 10 is used as a printer, print conditions can be set by a printer driver in the external device 5. The print conditions set here are stored in the page memory 122 through the external device 5, the LAN IF 165, the image memory 162, the DRAM control IC 161 (controller), and the DRAM control IC 111 (body), as with an image.

In addition, in the printer unit 150, the printer control unit 151 instructed by the image control CPU 113 controls each unit.

When the image forming apparatus body 10 outputs an image, print conditions are set through the operation unit 140, and the image control CPU 113 can control print according to the setting. In the image forming unit 15, after a toner image that is written be the LD 15E to each of the photoreceptors 15A and that is developed is transferred to the intermediate transfer belt 15B, the secondary transfer roller 15C transfers the toner image on a paper sheet fed from a set paper feed tray in the paper feeder 20, and then the fixing unit 15D fixes the toner image. The paper sheet on which the image is formed is directly fed to the foil stamping press 30 through the feeding path 14, or is fed to the inversion section 14C so that an image is formed on a back face the paper sheet.

When a job is designated as forming a base image, and transferring and overprinting the base image, a foil image is transferred on a paper sheet by the foil stamping press 30 if the base image is formed on the paper sheet, and then the paper sheet is fed to the post-processing unit 40. The paper sheet on which the foil image is formed is set in a paper feed tray in the paper feeder 20 or in the image forming apparatus body 10, and overprinting is applied to the paper sheet.

When the overprinting has been applied, pressing of the paper sheet in the foil film sheet transfer unit 31 is released in the foil stamping press to feed the paper sheet to the post-processing unit 40, and then post-processing is applied to the paper sheet, as needed.

In the present embodiment, one image forming apparatus prints a base image and an overprint image.

In overprinting, first image data related to a base image second image data related to an overprint image are associated with each other to be managed by a control unit.

Figure 3:
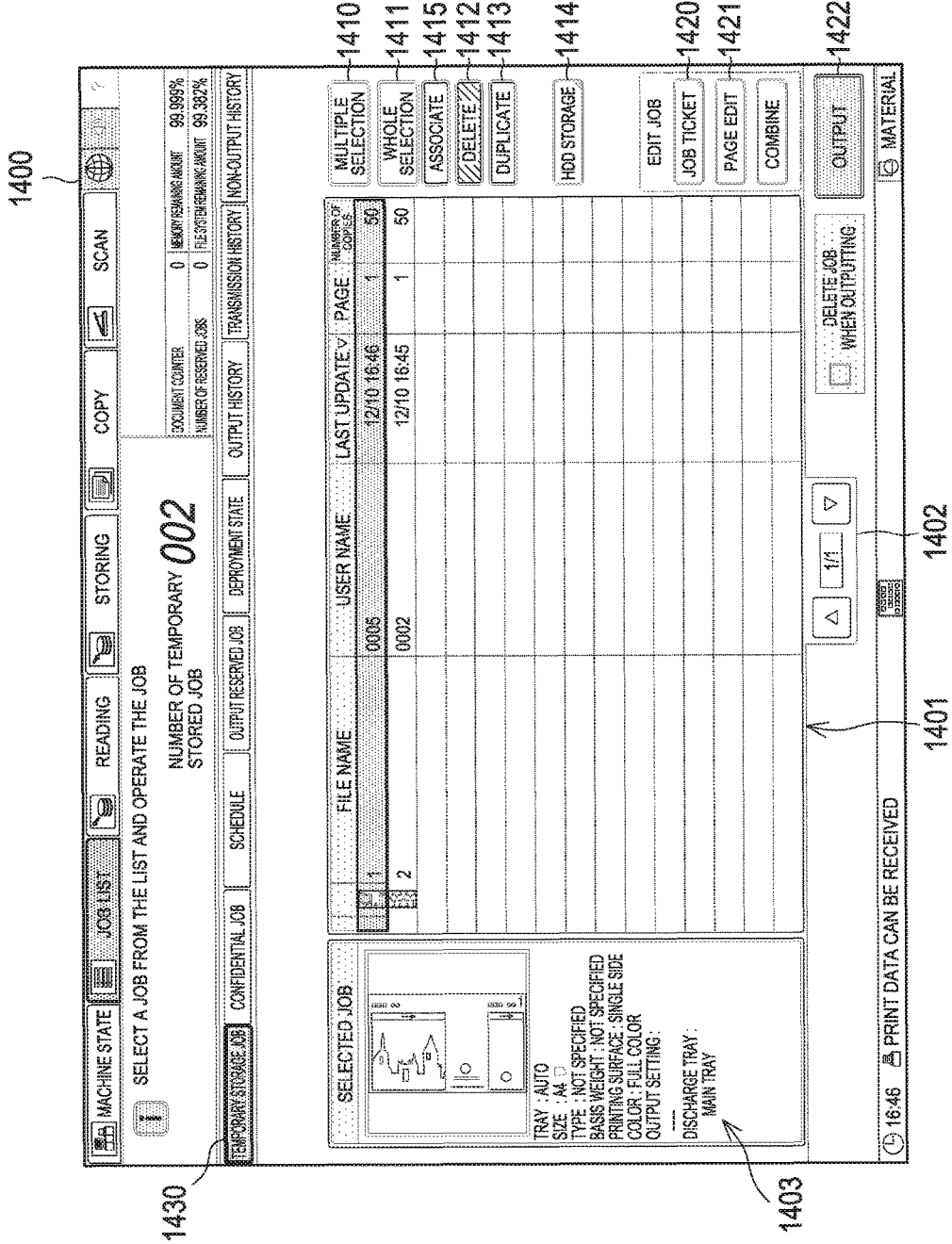
FIG. 3 illustrates an operation screen of the embodiment, associating a job of a base image with a job of an overprint image.

FIG. 3 illustrates a setting screen 1400 of a job.

In the job setting screen, a job list screen 1401 is displayed in a screen of a temporary storage tab 1430 to enable a job of each list to be selected. If there are many jobs, a page of another job list can be displayed by operating a page turning button 1402. There is provided a region on a left side of the job list screen 1401 for a preview screen 1403 in which an image of a job selected is displayed.

On a right side of the job list screen 1401, there is provided a plurality of operation buttons to be used to edit a job so that they can be pressed down.

In a group of buttons used for an edit, a multiple-selection button 1410 and a whole-selection button 1411 are displayed downward from an uppermost stage so that they can be pressed down. Pressing down the multiple-selection button 1410 enables a plurality of jobs in the job list screen 1401 to be selected. Pressing down the whole-selection button 1411 enables all jobs displayed in the job list screen 1401 to be selected.

Below the whole selection button 1411, an associating button 1415 is displayed so that it can be pressed down. The associating button 1415 associates selected jobs with each other. For association, a job ticket button 1420 and the like described later can be configured to set a base and overprint, or a base and overprinting can be set in order of selection, for example.

Below the associating button 1415, a deleting button 1412, a duplicating button 1413, and an HDD-storage button 1414 are provided so that they can be pressed down. The deleting button 1412 is configured to delete a selected job from a job list, and the duplicating button 1413 enables a selected job to be duplicated as a new job to be listed in a job list. The HDD-storage button 1414 enables a selected job in the image memory to be stored in the HDD.

For an edit of a job, the job ticket button 1420 and a page-edit button 1421 are displayed so that they can be pressed down, and thus a job can be edited.

Pressing an output button 1422 allows a selected job to be printed.

Pressing the output button 1422 after a job of a base image is selected allows a base image to be printed on a blank sheet to create a paper sheet on which the base image is printed. The output paper sheet is returned to a paper feed tray, and then a job of an overprint image is selected to perform print to enable a final deliverable to be acquired. The job of a base image and the job of an overprint image are associated with each other, and thus if association between both the jobs is displayed in the job list screen 1401 so as to be visible, an overprint image can be immediately selected. Since both of a base image and an overprint image are printed to form a final deliverable, the two jobs are managed by being associated with each other.

FIG. 3 illustrates a panel display of an image forming apparatus when a job of a base image and a job of an overprint image are registered in one image forming apparatus. An operator selects the two jobs and associates them with each other to enable the image forming apparatus to grasp that the number of print times of the job of the base image and the job of the overprint image is to be identical to each other.

Figure 4:
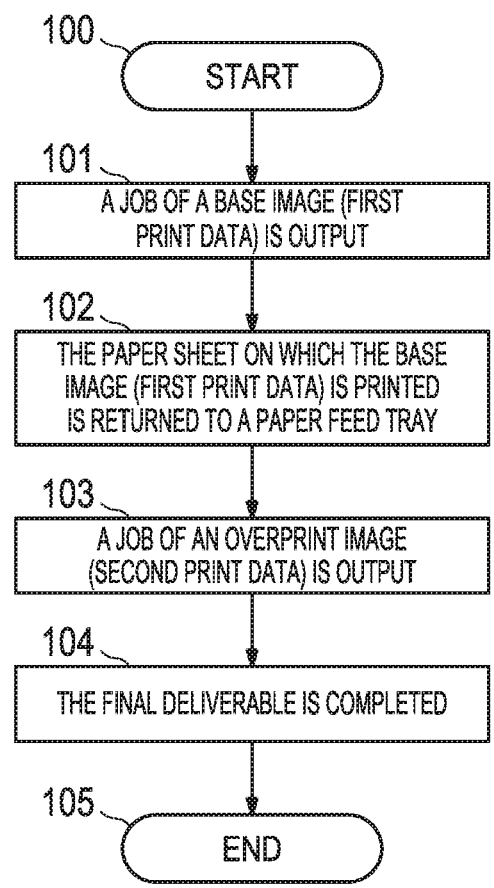
FIG. 4 is a flow chart illustrating a procedure for printing a base image and an overprint image by using the same image forming apparatus.

A sequence when a base image and an overprint image are printed by one image forming apparatus to create a final deliverable is shown below in a flow chart of FIG. 4. The procedure below is performed by control of a control unit. A number in parentheses designates a step number of the sequence. The same applies to sequences below.

(100) The sequence is started.

(101) An operator selects a job of a base image. The base image has first print data, and output with the data is instructed. A paper sheet on which the base image is printed is fed to an output tray.

(102) An operator returns the paper sheet on which the base image is printed, fed to the output tray, to a paper feed tray.

(103) An operator selects a job of an overprint image. The overprint image has second print data, and output with the data is instructed.

(104) A paper sheet on which the overprint image is printed is fed to the output tray. This is to be a final deliverable.

(105) The sequence is finished.

In a case where a jam occurs during output of a job of an overprint image (second print data), a paper sheet on which a base image (first print data) is printed is removed by jam processing, and thus a paper sheet on which the base image (first print data) is printed runs out. Then, the image forming apparatus calculates how many sheets are removed (how many sheets are short) during the jam processing, and instructs an operator to insert how many blank sheets into a paper feed tray. Since a job of a base image and a job of an overprint image are associated with each other, the number of paper sheets of both the base image and the overprint image can be easily checked. When blank sheets are inserted into the paper feed tray to restart the job, the base image (first print data) is reprinted, and then an operator inserts the output paper sheet into the paper feed tray. After that, the print job of the overprint image (second image data) is restarted to enable a shortage of a final deliverable to be prevented.

Figure 5:
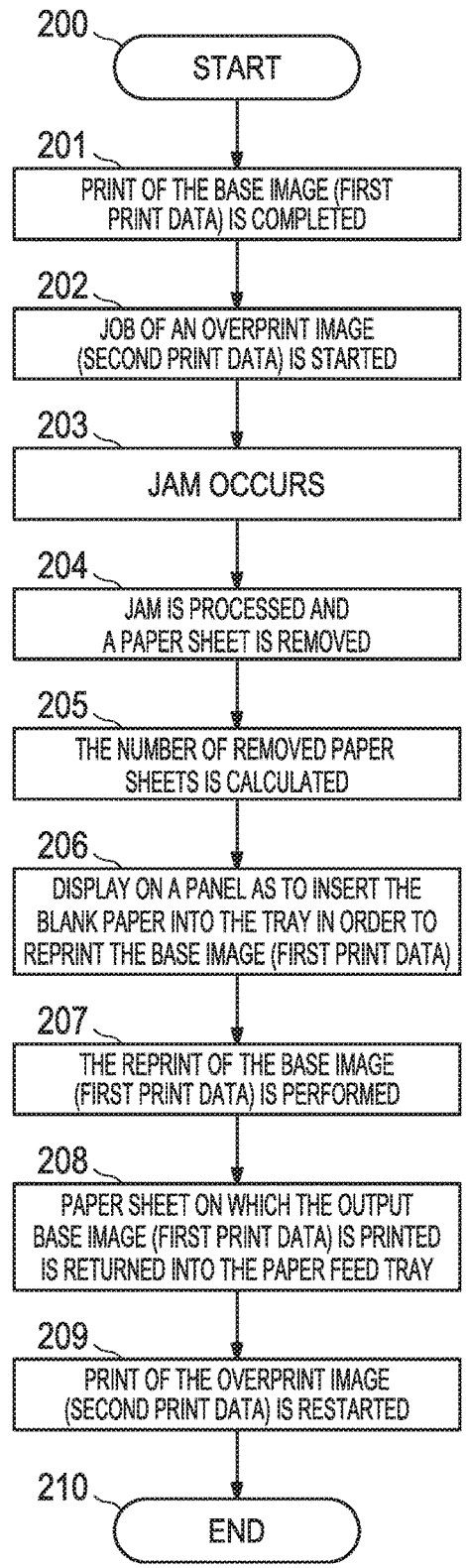
FIG. 5 is a flow chart illustrating a procedure in which when a jam occurs during print of an overprint image in an embodiment of the present invention, the print of the overprint image is stopped to reprint a base image.

FIG. 5 illustrates a sequence when an image forming apparatus reprints a base image (first print data) in a case where a jam occurs. The procedure below is performed by control of a control unit.

(200) The sequence is started.
(201) Print of the base image (first print data) is completed. An operator returns a paper sheet on which the base image (first print data) is printed to a paper feed tray.
(202) A job of an overprint image (second print data) is started.
(203) A jam occurs.
(204) An operator processes the jam. Then, a paper sheet remaining in the image forming apparatus is removed.
(205) The image forming apparatus compares the number of paper sheets that have been ejected in the job of the overprint image (second print data) and paper sheets required for additional print, with the number of paper sheets output in a job of the base image (first print data), and determines that reprint of the base image is needed if the number of paper sheets output in the job the base image (first print data) is lower.
(206) The number of paper sheets required for the reprint of the base image (first print data) is displayed in a panel. An operator inserts blank sheets into the paper feed tray according to the display in the panel.
(207) The reprint of the base image (first print data) is performed. The number of paper sheets calculated in step (205) is printed.
(208) A paper sheet on which the base image (first print data) is printed is ejected, and then an operator inserts the paper sheet into the paper feed tray.
(209) The job of the overprint image (second print data) is restarted.
(210) The sequence is finished.

Figure 6:
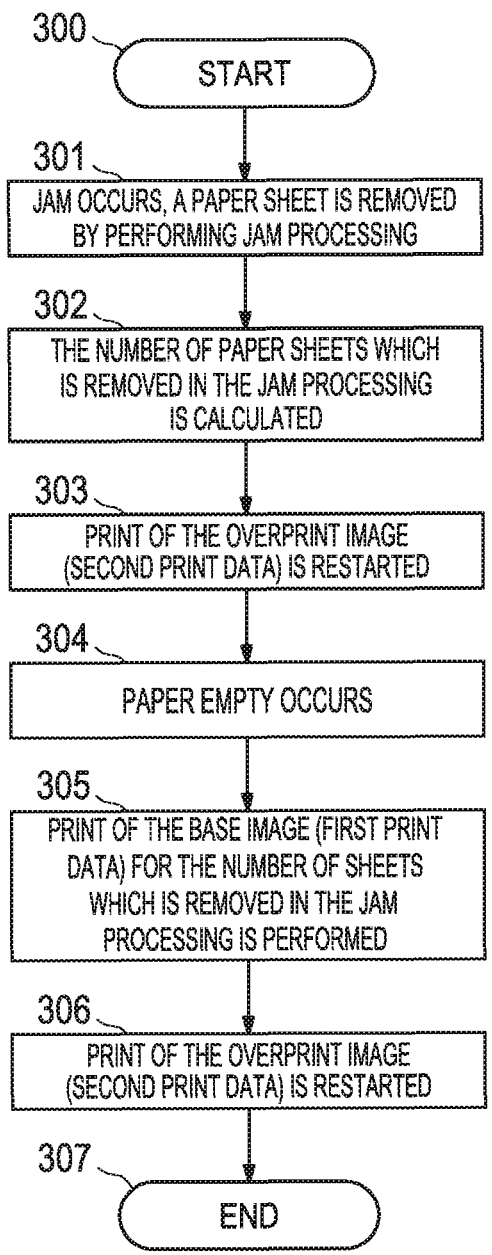
FIG. 6 is a flow chart illustrating a procedure in which when a jam occurs during print of an overprint image in another embodiment of the present invention, the print of the overprint image is continued to reprint a base image without a paper sheet and to restart overprinting.

FIG. 6 illustrates a sequence in which reprint of a base image (first print data) is not performed and print of an overprint image (second print data) is continued after jam processing, and the reprint of the base image (first print data) is performed after a paper sheet runs out.

This sequence is used when the base image (first print data) output needs post-processing such as that in a foil stamping press. In a case where preparation (warm up) of a post-processing device is needed, outputting the base image (first print data) by stopping print of the overprint image (second print data) causes waiting time for preparation of the post-processing device. To avoid this, the print of the overprint image (second print data) is continued as far as possible, and preparation of a post-processing device as well as reprint of the base image (first print data) is performed after a paper sheet runs out.

(300) The sequence is started.
(301) A jam occurs during print of the overprint image (second print data), and then a paper sheet is removed by performing jam processing.
(302) An image forming apparatus calculates the number of paper sheets removed in the jam processing by using algorithm same as that used in step (205) of FIG. 5.
(303) The print of the overprint image (second print data) is restarted.
(304) Since a paper sheet on which the base image (first print data) is printed runs short, paper empty occurs.
(305) The base image (first print data) is printed for the number of paper sheets for additional print calculated in step (302). As with FIG. 5, the number of blank sheets to be inserted into the paper feed tray is displayed in the panel. An operator returns an output paper sheet on which the base image (first print data) is printed to the paper feed tray.
(306) The print of the overprint image (second print data) is restarted.
(307) The sequence is finished.

Figure 7:
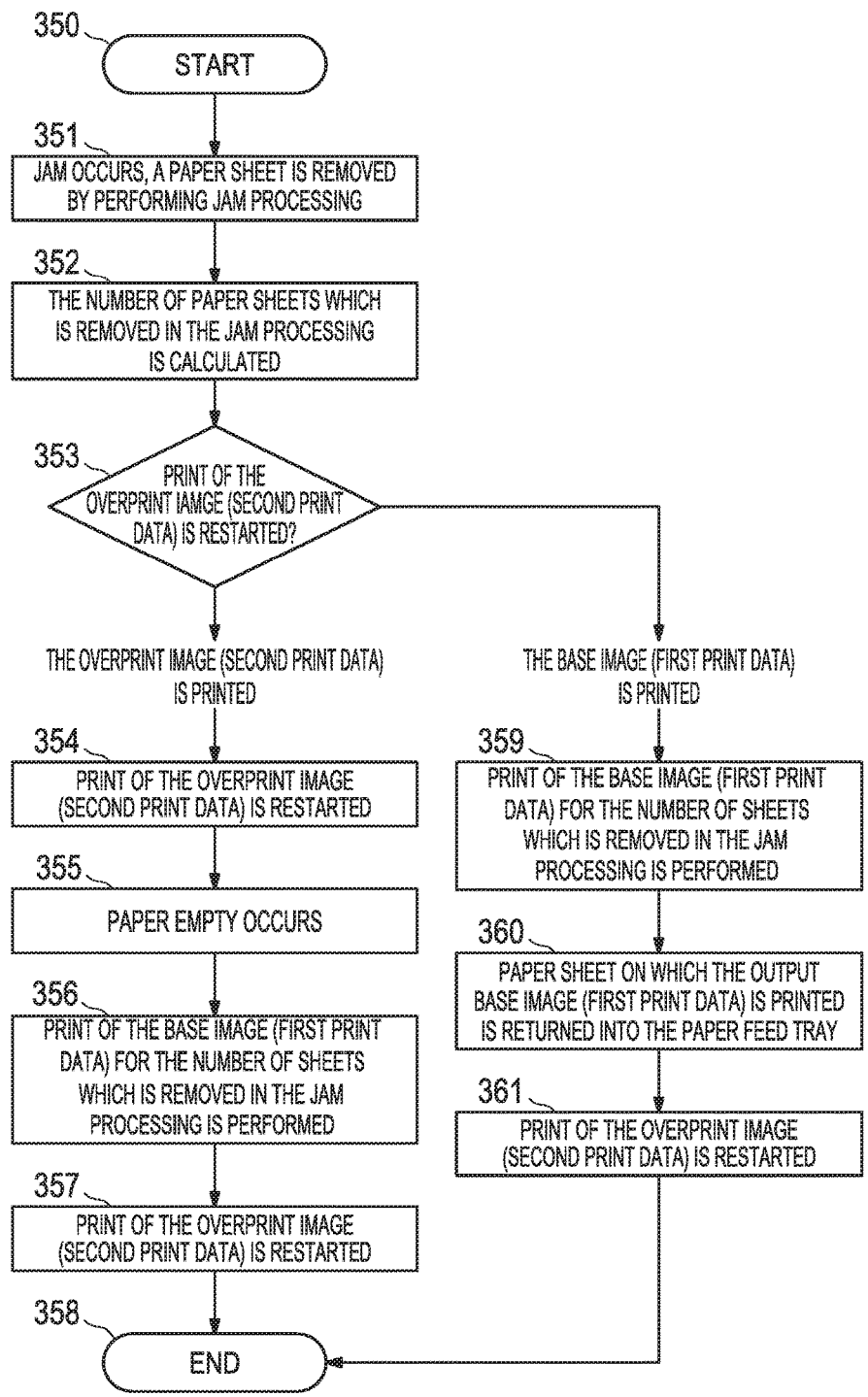
FIG. 7 is a flow chart illustrating a procedure in which when a jam occurs during print of an overprint image in yet another embodiment of the present invention, processing is performed by selecting print of an overprint image and reprint of base image.

FIG. 7 illustrates a sequence in which print is performed by selecting whether to restart print of an overprint image or reprint a base image (first print data) after jam processing.

(350) The sequence is started.
(351) A jam occurs during print of the overprint image (second print data), and then a paper sheet is removed by performing jam processing.
(352) An image forming apparatus calculates the number of paper sheets removed in the jam processing by using algorithm same as that used in step (205) of FIG. 5.
(353) After the jam processing, it is determined whether to restart the print of the overprint image (second print data). Whether to restart the print of the overprint image (second print data) can be set in advance in initial setting or set by manipulated input through the operation unit 140, or can be set by asking a user in this state through the operation unit 140 to allow the user to manually input setting.
(354) In a case where the print of the overprint image is restarted, the print of the overprint image (second print data) is restarted.
(355) Since a paper sheet on which the base image (first print data) is printed runs short and paper empty occurs.
(356) The base image (first print data) is printed for the number of paper sheets for additional print calculated in step (352). As with FIG. 5, the number of blank sheets to be inserted into a paper feed tray is displayed in the panel. An operator returns an output paper sheet on which the base image (first print data) is printed to the paper feed tray.
(357) The print of the overprint image (second print data) is restarted.
(358) The sequence is finished.
(359) In a case where it is determined in step (353) that the print of the overprint image (second print data) is not restarted, a base image (first print data) is printed for the number of paper sheets removed in the jam processing.
(360) An output paper sheet on which the base image (first print data) is printed is returned to the paper feed tray.
(361) The print of the overprint image (second print data) is restarted.
(358) The sequence is finished.

Figure 8:
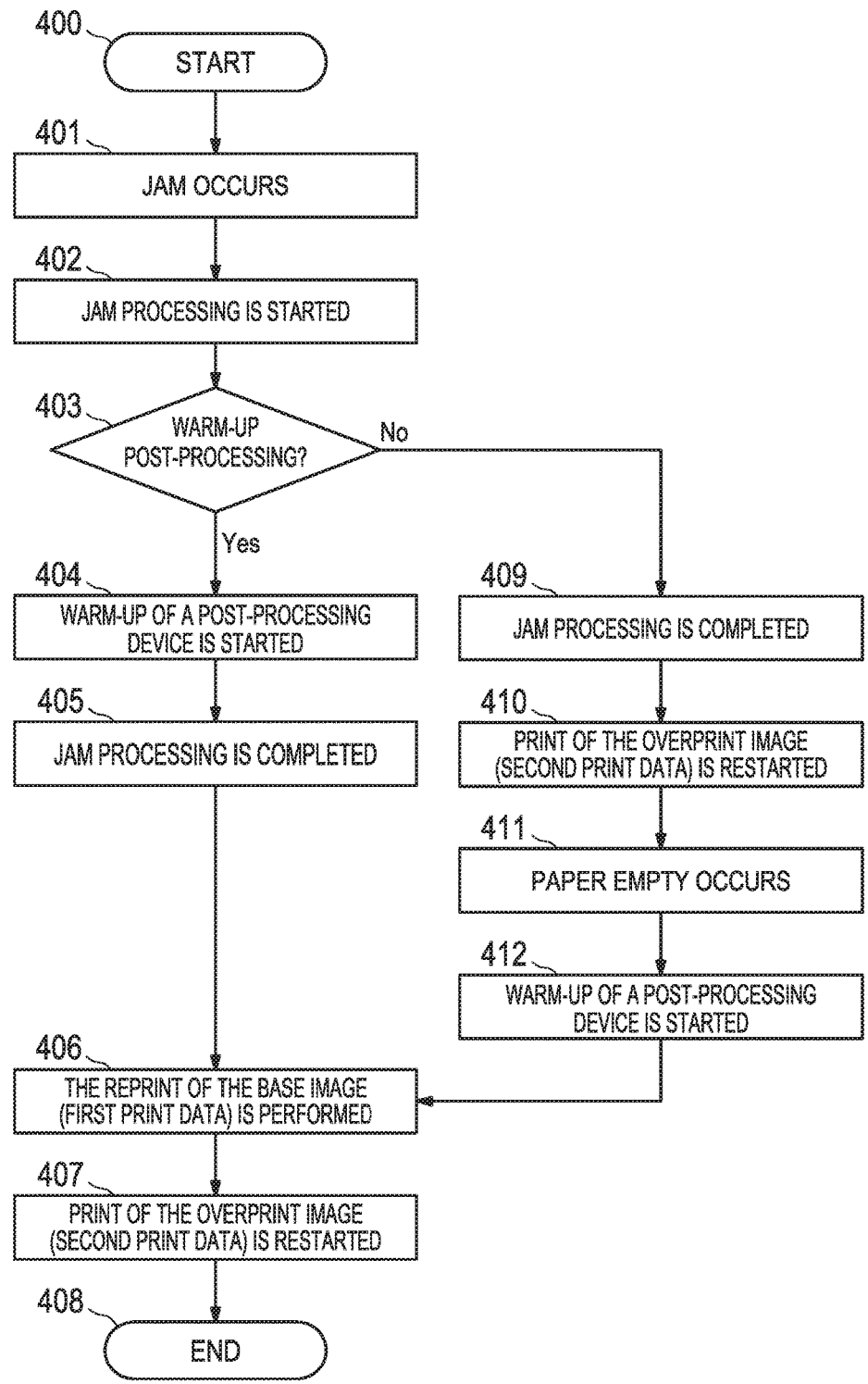
FIG. 8 is a flow chart illustrating a procedure in which when a jam occurs during print of an overprint image in yet another embodiment of the present invention, processing is performed by selecting whether a warm up of a post-processing device is to be started.

In a case where print of a base image (first print data) needs a post-processing device (e.g. a foil stamping press), warm up of the post-processing device is started during jam processing so that the base image (first print data) can be output immediately after the jam processing is finished. An operator is allowed to select whether to output the base image (first print data) after warm up is performed during the jam processing, or to warm up the post-processing device to output the base image (first print data) after all outputs of an overprint image (second image data) are completed. FIG. 8 illustrates a sequence.
(400) The sequence is started.
(401) A jam occurs during print of the overprint image (second print data).
(402) Jam processing is started.
(403) It is determined whether to warm up post-processing. Whether to perform warm up when the jam occurs can be set in advance in initial setting or can be set by a user through the operation unit 140. In addition, asking the operation unit 140 when a jam occurs can allow a user to perform selection.
(404) In a case where it is determined to perform warm up when a jam occurs, warm up of a post-processing device is started.
(405) Jam processing is performed to remove a paper sheet.
(406) The base image (first print data) is reprinted.
(407) The print of the overprint image (second print data) is restarted.
(408) The sequence is finished.
(409) In a case where it is determined in step (403) that warm up is not performed when a jam occurs, jam processing is performed to remove a paper sheet.
(410) The print of the overprint image (second print data) is restarted.
(411) Since a paper sheet on which the base image (first print data) is printed runs short, paper empty occurs.
(412) Warm up of the post-processing device is started.
(406) The base image (first print data) is reprinted.
(407) The print of the overprint image (second print data) is restarted.
(408) The sequence is finished.

When a base image (first print data) is output, extra output of a base image (first print data) is performed in anticipation of a jam that occurs during output of an overprint image (second image data). When a spare base image (first print data) runs out, a base image (first print data) for a shortage is output. Determination whether there is spare output of abase image (first print data) is achieved by comparing the number of outputs of a base image (first print data) with the number of copies set by output of an overprint image (second image data). If the number of outputs of a base image (first print data) is insufficient, a re-output sequence of the base image (first print data) starts. If the number of outputs of the base image (first print data) is sufficient, the re-output sequence of the base image (first print data) does not start. FIG. 9 illustrates the sequence.
(500) The sequence is started.
(501) From a panel of an image forming apparatus, an operator specifies the number of extra outputs when output of a base image (first print data) is performed.
(502) Print of the base image (first print data) is performed. An operator returns an output paper sheet on which the base image (first print data) is printed to a paper feed tray.
(503) Print of an overprint image (second image data) is performed.
(504) A jam occurs, and then jam processing is performed to remove a paper sheet.
(505) The print of the overprint image (second image data) is restarted.
(506) In a case where a paper sheet on which the base image (first print data) is printed runs short during the print of the overprint image (second image data), processing proceeds to step (509). In a case where a job of the overprint image (second image data) is completed without causing a paper sheet on which the base image (first print data) is printed to run out, the processing proceeds to step (507).
(507) The job of the overprint image (second image data) is completed.
(508) Since a paper sheet on which the base image (first print data) is printed is insufficient, a job of the base image (first print data) is performed to create again a paper sheet on which the base image (first print data) is printed.
(509) An operator returns an output paper sheet on which the base image (first print data) is printed to the paper feed tray, and the job of the overprint image (second image data) is restarted.
(510) The sequence is finished.

The configuration of the present invention is particularly needed in a case where a post-processing device (e.g. a foil stamping press) configured to complete print of a base image (first image data) is provided downstream of an image forming apparatus.

To perform processing in the order of processing of a base image (first print data), processing in a post-processing device, and processing of an overprint image (second print data), a paper sheet on which the base image (first image data) is printed needs to be returned to a paper feed tray and to be printed twice by the same image forming apparatus. In a system in which print of a base image (first image data) and print of an overprint image (second print data) are performed in series tandem, the function of the present invention does not need to be achieved.

While there is described a case in the embodiments above where a foil image is formed as a base image, and then an overprint image is formed, a relationship of a base image and an overprint image is not limited to the case, and the present invention can be applied to various combinations of abase image and an overprint image.

According to the above-mentioned embodiments of the present invention, in a case where a base image and an overprint image are output by the same image forming apparatus, even if a jam occurs when an overprint image is printed, a job can be completed without a shortage of final deliverables by replenishing a transfer medium on which a base image is printed by the image forming apparatus.

Although the present invention has been described and illustrated in detail, it is clearly understood that the same is by way of illustrated and example only and is not to be taken by way limitation, the scope of the present invention being interpreted by terms of the appended claims.

What is claimed is:
1. An image forming apparatus comprising:
an image forming unit that forms an image on a transfer medium on the basis of image data;
a feeder that feeds the transfer medium; and
a control unit that manages image data and controls the image forming unit and the feeder,
wherein the control unit is configured to associate two print jobs selected by an operator, set one of the print jobs with a first print data as a base image, and set the other of the two print jobs with a second print data as an overprint image,
wherein, in a case where the base image is to be first printed on a first side of the transfer medium by the image forming apparatus, the transfer medium with the base image is to be placed back into the feeder, and the overprint image is to be applied on the first side of the transfer medium to the base image by the image forming apparatus, when a jam of the transfer medium is detected during an output of the overprint image the control unit causes a transfer medium to which the base image is output by the image forming apparatus to be replenished for print in place of a jammed transfer medium removed by jam processing, and wherein the control unit causes the transfer medium to which the base image is output to be replenished by one of:

(i) causing blank replacement transfer medium in an amount of transfer medium removed during jam processing to be inserted in the feeder, the base image to be reprinted on the blank replacement transfer medium, and the replacement transfer medium with the reprinted base image to be returned to the feeder before restarting printing of the overprint images after the jam processing; or (ii) causing printing of the overprint images to be restarted until a paper empty condition occurs in the feeder, blank replacement transfer medium to be inserted in the feeder, the base image to be printed on the blank replacement transfer medium, and the overprint image to be printed on the replacement transfer medium with the base image.

2. The image forming apparatus according to claim 1, wherein
the control unit causes the replacement transfer medium with the reprinted base image to be replenished for an insufficient transfer medium due to the jam after print for residual overprint images is continued and completed after the jam processing, and causes an overprint image to be printed on the replacement transfer medium which is replenished.

3. The image forming apparatus according to claim 1, wherein
when post-processing for the base image is needed, the control unit causes a post-processing device to be started for warm up after the jam is detected, and causes the replacement transfer medium with the reprinted base image to be replenished for an insufficient transfer medium due to the jam after jam processing is finished.

4. The image forming apparatus according to claim 1, wherein
the control unit causes an additional transfer medium to which a base image is output again to be used for the replenishment.

5. The image forming apparatus according to claim 1, wherein
the control unit causes extra output to be performed when the transfer medium to which a base image is printed is prepared, and causes the transfer medium for a shortage to be output when spare transfer media to which a base image is printed run out.

6. The image forming apparatus according to claim 1, wherein the control unit compares q number of outputs of the base image with number of copies set by output of the overprint image, and starts a procedure of output of the base image in a case where the number of outputs of a base image is insufficient, and does not start the procedure of output of the base image base image in a case where the number of outputs of a base image is sufficient.

7. The image forming apparatus according to claim 1, further comprising:
a post-processing device that applies post-processing to the transfer medium on which an image is formed.

8. An image forming method comprising the steps of:
associating two print jobs selected by an operator, setting one of the print jobs with a first a first print data as a base image, and setting the other of the print jobs with a second print data as an overprint image;

determining whether a jam of a transfer medium occurs during output of an overprint image in a case where a base image is first printed on a first side of the transfer medium by a image forming apparatus and then overprinting an overprint image is applied on the first side of the transfer medium to the base image by the image forming apparatus; and replenishing a transfer medium to which the base image is output by the image forming apparatus for print instead of a jammed transfer medium removed through jam processing when the jam occurs;

wherein the step of replenishing comprises one of:

(i) causing blank replacement paper in an amount of transfer medium removed during jam processing to be inserted in the feeder, the base image to be reprinted on the blank replacement paper, and the replacement paper with the reprinted base image to be returned to the feeder before restarting printing of the overprint images after the jam processing; or (ii) causing printing of the overprint images to be restarted until a paper empty condition occurs in the feeder, blank replacement paper to be inserted in the feeder, the base image to be printed on the blank replacement paper, and the overprint image to be printed on the replacement paper with the base image.

9. The image forming apparatus according to claim 1, wherein when a jam of the transfer medium is detected during output of an overprint image in a case where the base image and the overprint image are printed by the image forming apparatus, the control unit performs control of causing an additional transfer medium to which the base image is output by the image forming apparatus to be replenished for print instead of a jammed transfer medium removed through jam processing.

10. The image forming apparatus according to claim 9, wherein
the control unit manages a job of the base image and a job of the overprint image by associating the jobs with each other when the base image and the overprint image are printed by the same forming apparatus.

11. The image forming apparatus according to claim 1, wherein the control unit causes the transfer medium to be replenished by determining a number of sheets removed during jam processing and providing an instruction to the operator indicating how many blank sheet to insert into a paper feed tray of the feeder.

12. The image forming method according to claim 8, wherein the step of replenishing includes:
when a jam of the transfer medium is detected during output of an overprint image in a case where a base image and an overprint image are printed by the image forming apparatus, determining a number of sheets removed during jam processing and providing an instruction to the operator indicating how many blank sheet to insert into a paper feed tray of the feeder.

* * * * *